United States Patent [19]
Wohlrab

[11] Patent Number: 5,336,462
[45] Date of Patent: Aug. 9, 1994

[54] MOLD-CLOSING APPARATUS FOR INJECTION-MOLDING MACHINE

[75] Inventor: Walter Wohlrab, Weissenburg, Fed. Rep. of Germany

[73] Assignee: Krauss-Maffei AG, Munich, Fed. Rep. of Germany

[21] Appl. No.: 25,943

[22] Filed: Mar. 2, 1993

[30] Foreign Application Priority Data

Mar. 23, 1992 [DE] Fed. Rep. of Germany ....... 4209392

[51] Int. Cl.$^5$ .............................. B29C 45/68
[52] U.S. Cl. .................. 264/328.1; 425/590; 425/595; 425/451.2; 425/DIG. 223
[58] Field of Search .............. 264/328.1; 425/589, 425/590, 595, 450.1, 451.2, 451.9, DIG. 223

[56] References Cited

U.S. PATENT DOCUMENTS

| | | | |
|---|---|---|---|
| 3,418,693 | 12/1968 | Harrison | 425/DIG. 223 |
| 3,663,140 | 5/1972 | Hehl | 425/590 |
| 4,105,385 | 8/1978 | Hehl | 425/595 |
| 4,443,179 | 4/1984 | Wohlrab | 425/590 |
| 4,846,664 | 7/1989 | Hehl | 425/589 |
| 4,865,537 | 9/1989 | Shima | 425/DIG. 223 |
| 5,129,806 | 7/1992 | Hehl | 425/590 |
| 5,204,047 | 4/1993 | Wohlrab | 425/590 |

FOREIGN PATENT DOCUMENTS

| | | |
|---|---|---|
| 296410 | 12/1988 | European Pat. Off. . |
| 1625651 | 8/1970 | Fed. Rep. of Germany . |
| 2414668 | 10/1975 | Fed. Rep. of Germany . |
| 2631603 | 1/1978 | Fed. Rep. of Germany . |
| 2811332 | 12/1978 | Fed. Rep. of Germany . |
| 2845448 | 4/1980 | Fed. Rep. of Germany . |
| 3008715 | 10/1980 | Fed. Rep. of Germany . |
| 226039 | 8/1985 | Fed. Rep. of Germany . |
| 2852516 | 1/1987 | Fed. Rep. of Germany . |

OTHER PUBLICATIONS

E. Sauerbruch; "Aufbau und Funktion Einer Neuartigen Spritzgiessmaschine"; Kunststoffe-Bd. 61-19-71-H.6; 2 pp.

*Primary Examiner*—James Mackey
*Attorney, Agent, or Firm*—Herbert Dubno; Andrew Wilford

[57] ABSTRACT

A molding system has a base, a fixed mold plate secured to the base, a fixed mold half carried on the fixed mold plate, a movable mold plate displaceable on the base longitudinally forward away from the fixed mold half and backward toward the fixed mold half, and a movable mold half carried on the movable plate and fittable with the fixed mold half. A mold-closing apparatus has a pair of main cylinders fixed to the fixed mold half and respective main pistons subdividing the main cylinders into respective front and rear main compartments and each having a piston rod secured to the movable mold plate and formed with a longitudinally extending chamber. A small-diameter fast-closing piston and cylinder are formed in one of the piston rods, and the other piston rod is provided internally with a force-amplifying piston unit. Two flow-control valves and check valves control the system.

10 Claims, 8 Drawing Sheets

MOLD-CLOSING APPARATUS FOR INJECTION-MOLDING MACHINE

FIELD OF THE INVENTION

The present invention relates to a mold-closing apparatus for an injection-molding machine. More particularly this invention concerns such an apparatus which closes the mold at high speed.

BACKGROUND OF THE INVENTION

A standard molding system has a base, a fixed mold plate secured to the base, a fixed mold half carried on the fixed mold plate, a movable mold plate displaceable on the base longitudinally forward away from the fixed mold half and backward toward the fixed mold half, and a movable mold half carried on the movable plate and fittable with the fixed mold half. Normally a plurality of massive cylinders are mounted on the fixed plate with their piston rods projecting through this plate and secured to the movable mold plate so that pressurization of these cylinders holds the mold tightly closed as molding material is injected into the closed mold and this material cures.

In order to speed operations, separate cylinders are provided for high-speed closing and opening of the mold, as the big pressurizing cylinders are designed to work at great pressure and are therefore fairly slow. Such systems are described in German patent document 1,625,651 of H. DeCorta et al (based on a French priority of Sep. 26, 1966), 2,811,332 of M. Manceau based on a French priority of May 25, 1977), 2,845,448 of K. Hehl, 3,008,715 of P Florjanolo, and 2,852,516 of W. Wohlrab (citing U.S. Pat. No. 3,418,693), as well as in East German patent 226,039 of S. Maras et al, European patent application 88 109,144 of Y. Kushibe et al, and in "Aufbau und Funktion einer neuartigen Spritzgiessmaschine" of E. Sauerbruch (*Kunststoff*, vol. 61, 1971, bk. 6).

Such systems are typically also provided with pressure-amplifying devices that serve to apply greatly augmented force via the main cylinders to the mold during the molding operation. Such a pressure-amplification system typically has a piston with one big face that is exposed to the high-pressure side of the source and an opposite much smaller face that pressurizes liquid that is applied to the pressurizing pistons. Thus the force is multiplied by a factor determined by the relative sizes of the two faces.

The main problem with these known systems is that they are all fairly complex. The fast-closing and -opening equipment as well as the force-amplification system are mounted on and around the mold plates, taking up space and making access to the mold difficult.

OBJECTS OF THE INVENTION

It is therefore an object of the present invention to provide an improved mold-closing apparatus for a molding system.

Another object is the provision of such an improved mold-closing apparatus for a molding system which overcomes the above-given disadvantages, that is which is compact and effective.

SUMMARY OF THE INVENTION

A molding system has a base, a fixed mold plate secured to the base, a fixed mold half carried on the fixed mold plate, a movable mold plate displaceable on the base longitudinally forward away from the fixed mold half and backward toward the fixed mold half, and a movable mold half carried on the movable plate and fittable with the fixed mold half. A mold-closing apparatus has according to the invention a pair of main cylinders fixed to the fixed mold half and respective main pistons subdividing the main cylinders into respective front and rear main compartments and each having a piston rod secured to the movable mold plate and formed with a longitudinally extending chamber. One of the main pistons is formed with a main longitudinal passage extending between a rear end of the respective longitudinally extending chamber and the respective rear main compartment and with a secondary radial passage extending between the rear end of the respective longitudinally extending chamber and the respective front main compartment. A small closing piston subdivides the chamber of the other main piston into a front opening compartment and a rear closing compartment and has a rearwardly extending piston rod fixed to the fixed mold plate. The small closing piston has a front face in the front opening compartment and a smaller annular rear face in the rear closing compartment. A pressure-amplifying piston subdivides the chamber of the one piston into a front control compartment and a rear pressure-amplifying compartment, is freely longitudinally movable therein, and has a front face in the front control compartment, a smaller annular rear face in the rear pressure-amplifying compartment, and a piston rod extending longitudinally rearward from the pressure-amplifying piston. A valve element longitudinally slidable on the rod of the pressure-amplifying piston engages sealingly in the main passage of the one main piston to block flow therethrough. The valve element and the pressure-amplifying piston are interconnected for displacement of the valve element out of blocking engagement in the main passage of the one main piston on displacement of the pressure-amplifying piston into a front position and into blocking engagement in the main passage on displacement of the pressure-amplifying piston into a rear position. A conduit interconnects the front main compartments and a source of fluid has a high-pressure side and a low-pressure side. A first valve unit is operable in a closing position for connecting the closing compartment of the other piston to the high-pressure side of the source and the opening compartment to the low-pressure side and in an opening position for connecting the closing compartment to the low-pressure side and the opening compartment to the high-pressure side. A second valve unit is operable in a closing position for preventing fluid flow into or out of the control compartment and thereby arresting the pressure-amplifying piston in its chamber, in a pressurizing position for connecting the control compartment to the high-pressure side and thereby displacing the pressure-amplifying piston toward its rear position, and in an opening position for connecting the control compartment to the low-pressure side.

Thus with this system the high-speed closing and opening cylinder is built into the piston rod of one of the big pressurizing pistons, and the force-amplifying unit is similarly built into the rod of the other big pressuring piston. As a result the system is extremely compact, as compact as a system without the fast-closing and force-amplifying units.

According to the invention the fixed mold plate has four such cylinders equispaced about the mold halves, diagonally opposite cylinders are identically configured. In addition the combined effective surface area of the front face of the small closing piston and of the rear face of the one piston is greater than the combined effective surface area of the front faces of the main pistons. Furthermore the combined effective surface area of the front faces of the main pistons is greater than the effective surface area of the back face of the one main piston.

The force-amplifying piston and the valve element can be interconnected by a spring connected between the valve element and the pressure-amplifying piston. Alternately this interconnection is formed by an abutment on the rod of the pressure-amplifying piston engageable forwardly with the valve element.

The first valve according to the invention includes a two-position reversing valve having two ports on one side and two ports on another side and a check valve connected between one of the ports of the other side of the valve and the low-pressure side. The two ports on the one side are connected to the opening and closing compartments, respectively. The one port of the other side also is permanently connected to the back main compartment of the cylinder of the one main piston. In addition the check valve maintains a predetermined pressure greater than the pressure of the low-pressure side in the back main compartment of the cylinder of the one main piston.

The second valve in accordance with this invention includes a three-position valve having on one side two ports connected to the low- and high-pressure sides of the source and another side with two ports, and a switchable check valve connected between one of the ports of the other side and the control compartment and oriented to normally permit flow only into the control compartment and having a pilot port connected to the other of the ports of the other side and pressurizable for bidirectional flow through the check valve.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
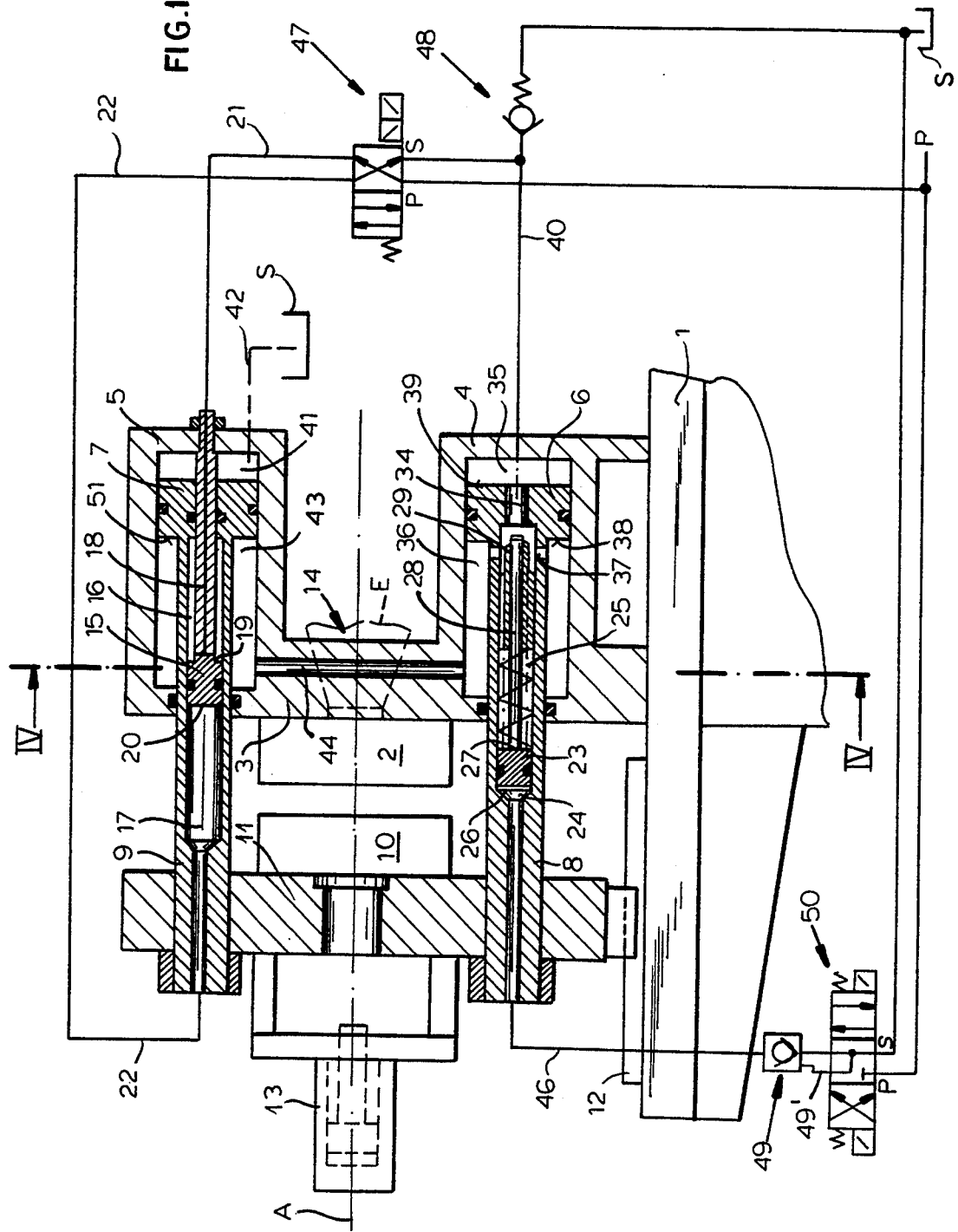
FIG. 1 is a schematic view of the apparatus of this invention during high-speed mold closing.

As seen in FIGS. 1 through 5, a mold-closing apparatus for an injection-molding machine has a base or frame 1 supporting a fixed mold half 2 on a stationary support plate 3 in turn carrying two cylinders 4 and two cylinders 5, arranged in a square pattern around the mold half 2 with the cylinders 4 diagonally opposite each other and the cylinders 5 also diagonally opposite each other. The cylinders 4 and 5 have respective pistons 6 and 7 with respective piston rods 8 and 9 that project longitudinally parallel to a center axis A and have outer ends carrying a movable plate 11 supporting a movable mold half 10 matable with the fixed mold half 2. As described in above-cited European patent application 88 109,144, the attachment of the rods 8 and 9 to the plate 11 can be releasable. The movable mold plate 11 rides on rails 12 on the base 1 and carries a knockout device 13 for ejecting a finished molded item from the mold 2, 10 at the end of the operation. An extruder shown partially and schematically in dashed lines at E fits in a hole 14 in the fixed mold plate 3.

The piston rods 9 of each cylinder 5 are set up for high-speed closing and are each internally provided with a piston 15 that forms a back compartment 16 and a front compartment 17. This piston 15 has a rod 18 that is fixed in the rear end wall of the cylinder 5, a small annular rear face 19 exposed in the compartment 16, and a large circular front face 20 exposed in the compartment 17. A conduit 21 extends through the rod 18 and opens into the compartment 16 rearward of the face 19 and another conduit 22 extends through the front end of the piston rod 9 to open into the front compartment 17.

Figure 5:
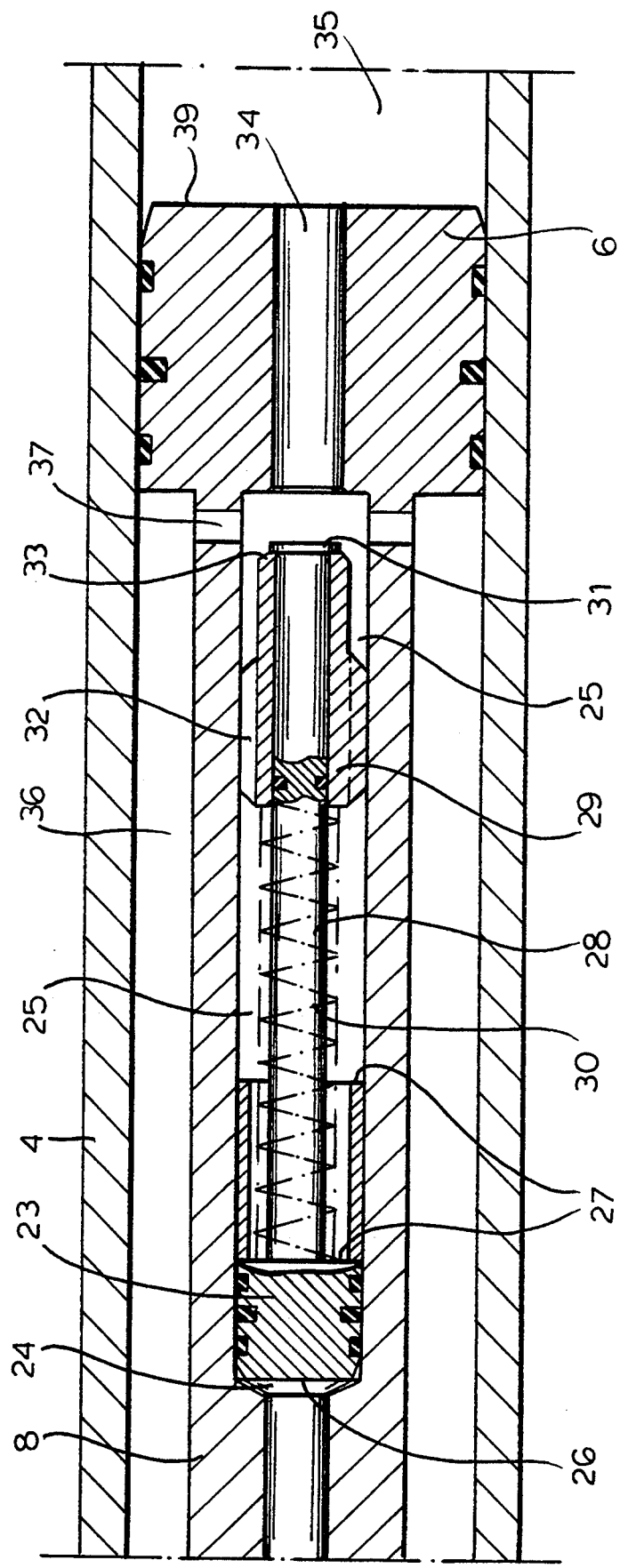
FIGS. 5 and 6 are large-scale views of details of FIGS. 1 and 2, respectively.

As best seen in FIG. 5, the piston rods 8 of each cylinder 4 are set up for pressure amplification and are each internally provided with a pressure-amplifying piston 23 forming a front compartment 24 and a rear compartment 25. The piston 23 has a large-size front face 26 exposed in the compartment 24 and a smaller annular rear face 27 exposed in the compartment 25. In addition this piston 23 has a piston rod 28 extending axially and carrying an axially shiftable valve element or sleeve 29 that is urged rearward away from the piston 23 by a spring 30 against an abutment 31 carried on the rear end of the rod 28. The valve sleeve 29 in turn is formed with axially throughgoing grooves or passages 32 and has a rear end 33 that can seat sealingly in a passage 34 formed in the rear end of the piston 6.

Figure 4:
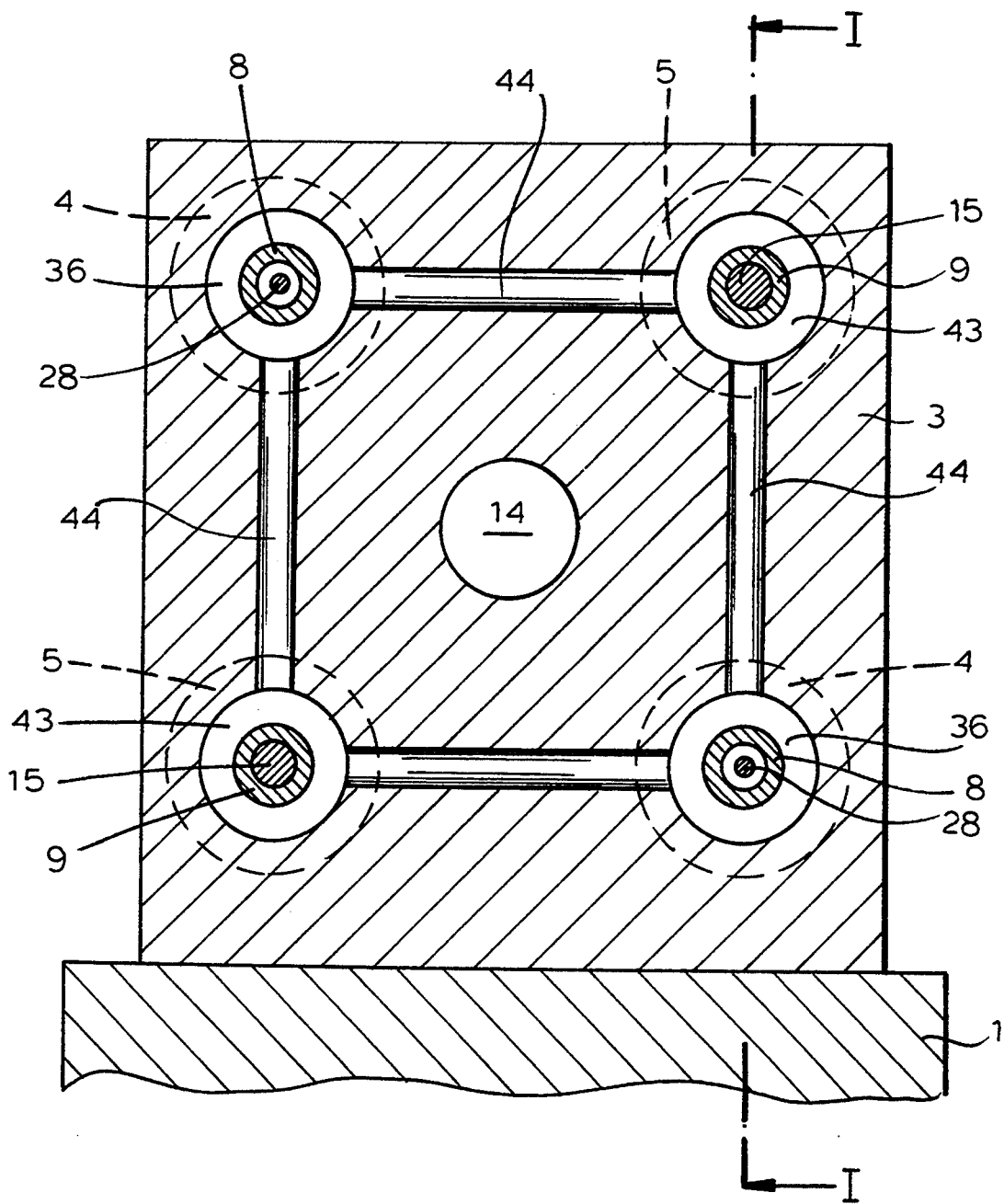
FIG. 4 is a section taken along line IV—IV of FIG. 1, line I—I of FIG. 4 being the section plane of FIG. 1.

This piston 6 forms back and front compartments 35 and 36 in the cylinder 4 and has front and back faces 38 and 39 exposed therein. Radial passages 37 permanently interconnect the rear end of the compartment 25 with the compartment 36 and a conduit 40 opens into the rear compartment 35. Similarly the piston 7 defines in the cylinder 5 a rear compartment 41 permanently connected via a line 42 to a sump S and a front compartment 43 connected as also seen in FIG. 4 via passages 44 formed in the plate 3 with other front compartments 43 and 36. A conduit 46 opens into the front compartment 24.

The combined surface area of the two faces 20 and 39 is greater than the combined surface areas of the front faces 38 and 51 which in turn is greater than the surface area of the back face 39.

A four-port reversing valve 47 is connected on one side to the conduits 21 and 22 of the respective compartments 16 and 17 and on the other side to the low-pressure or no-pressure sump S and to a high-pressure (200 bar) pump output P. A check valve 48 is interposed between the valve 47 and the sump S preventing flow from the sump S to the valve 47. This valve 48 is spring loaded to maintain upstream of itself a pressure of about 6 bar which is higher than the 0 bar pressure of the sump S.

A four-port three-position valve 50 is connected on one side to the high-pressure pump line P and sump S and on the other side to a switchable or selectable oneway valve 49 whose other side is connected to the line 46. In one end position (FIG. 2) the valve 50 feeds high pressure from P to the compartment 24, in the opposite position (FIG. 3) it permits flow from the line 46 to the sump S, and in the third middle (FIG. 1) position it blocks flow from the line 46 to the sump S. The check valve 49 has a pilot port or line 49' which, if pressurized, allows flow through the valve 49 in either direction, whereas when it is not pressurized it only permits flow toward the line 46.

Figure 7:
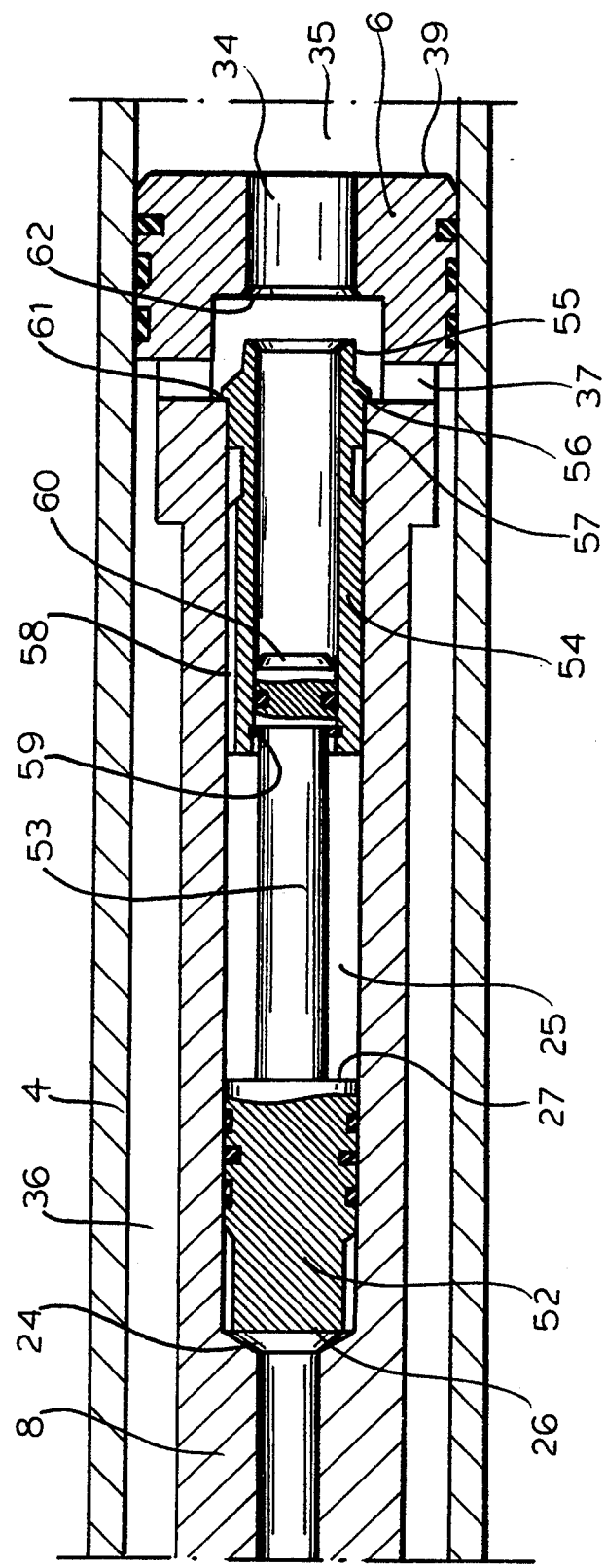
FIGS. 7 and 8 are views like FIGS. 5 and 6, respectively, showing an alternative system according to the invention.
Figure 8:
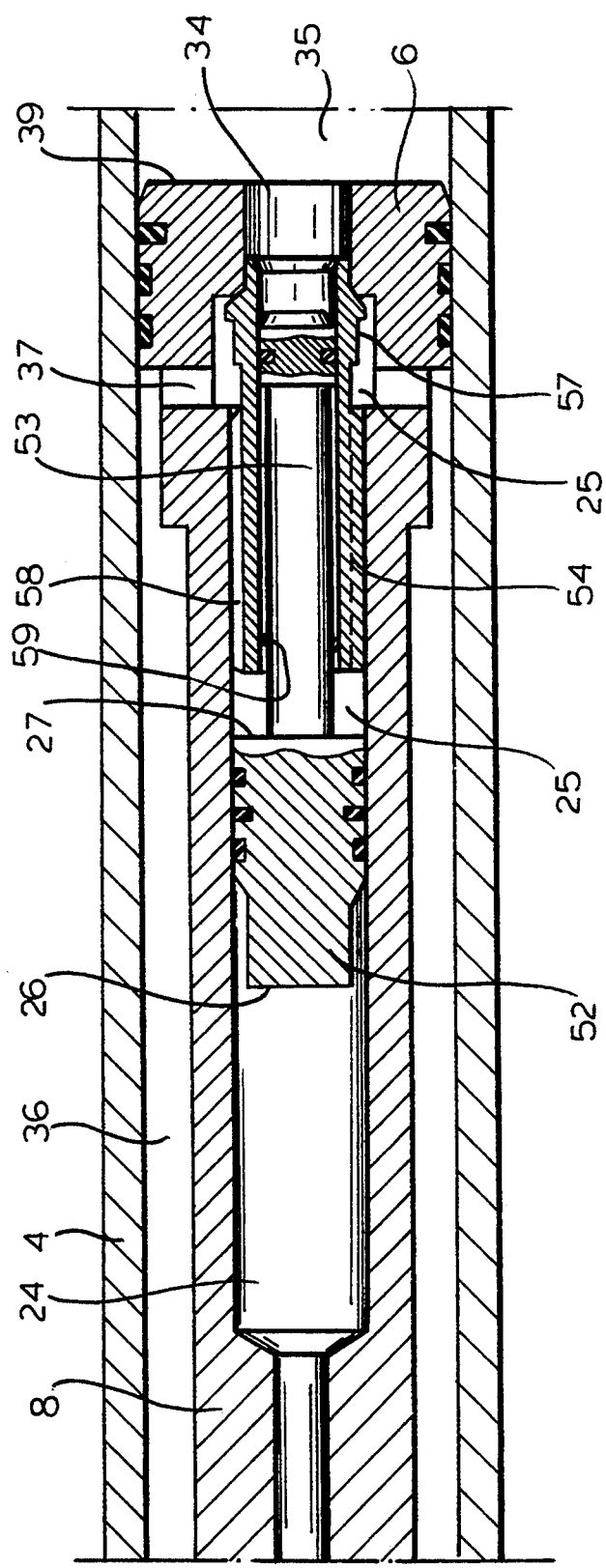

FIGS. 7 and 8 show another type of pressure-converting system in the piston rod 8. It has a pressure-converting piston 52 corresponding roughly to the piston 23 described above and having a guide rod 53 carrying a longitudinally slidable valve sleeve 54, with no spring between the parts 53 and 54. The valve sleeve 54 has a rear end 55 sealingly engageable in a seat 62 at the front end of the passage 34 and an abutment rim 56 engageable forwardly against a rearwardly facing shoulder 61 of the piston rod 8 at a cylindrical portion 55 of the sleeve 54 that can fit sealingly in the rear end of the compartment 25. The sleeve 54 is formed forward of its blocking portion 57 with a longitudinally throughgoing and radially outwardly open groove 58. Internally the body 54 has at its front end a radially inwardly projecting abutment ring 59 that can engage rearward with an abutment 60 on the rear end of the rod 53. Thus in its front end position, the sleeve 54 engages with its rim 56 on the shoulder 61 and in its rear end position its rear end 55 engages sealingly in the seat 62. The piston 52 can move rearward independently of the sleeve 54 but entrains the sleeve 54 into its forward end position when it is in its front end position as seen in FIG. 7.

The device described above operates as follows:

For high-speed closing of the mold 2, 10 the valves 47 and 49 are in the position of FIG. 1. High-pressure (200 bar) hydraulic fluid is fed by the valve 47 from the source P through the line 21 to both of the chambers 16. Each chamber 17 is similarly connected via the line 22 by the valve 47 to the sump S. Meanwhile the chambers 35 remain permanently connected via the line 40 to the sump S. As described above, the check valve 48 between the sump S and the valve 47 and line 40 ensures that a minimum back pressure of about 6 bar is maintained in the lines 21 and 40 and in the respective chambers 16 and 35.

The valve 50 in the position of FIG. 1 prevents any flow into or out of the chamber 24, thereby retaining the piston 23 (or the piston 52 of FIG. 7) in the full front position in which the valve element 29 (or 52) is pulled forward and the compartment 35 is connected via the passage 34, the compartment 25, and the passages 37 with the compartment 36.

Thus the pistons 7 will be driven back (to the right in FIG. 1) and will pull the pistons 6 with them. Liquid forced from the compartments 17 will move through the lines 22 and 40 to the compartments 35 and thence will be joined with liquid forced from the compartments 35 to pass through the compartments 25 and passages 37 to the compartments 36 where it can flow via the passages 44 to the compartments 43. Since the combined surface area of the piston faces 20 and 39 is greater than the combined surface area of the piston faces 38 and 51, more liquid is moved than can be accommodated, so that the excess will drain through the check valve 48 to the sump S.

Figure 2:
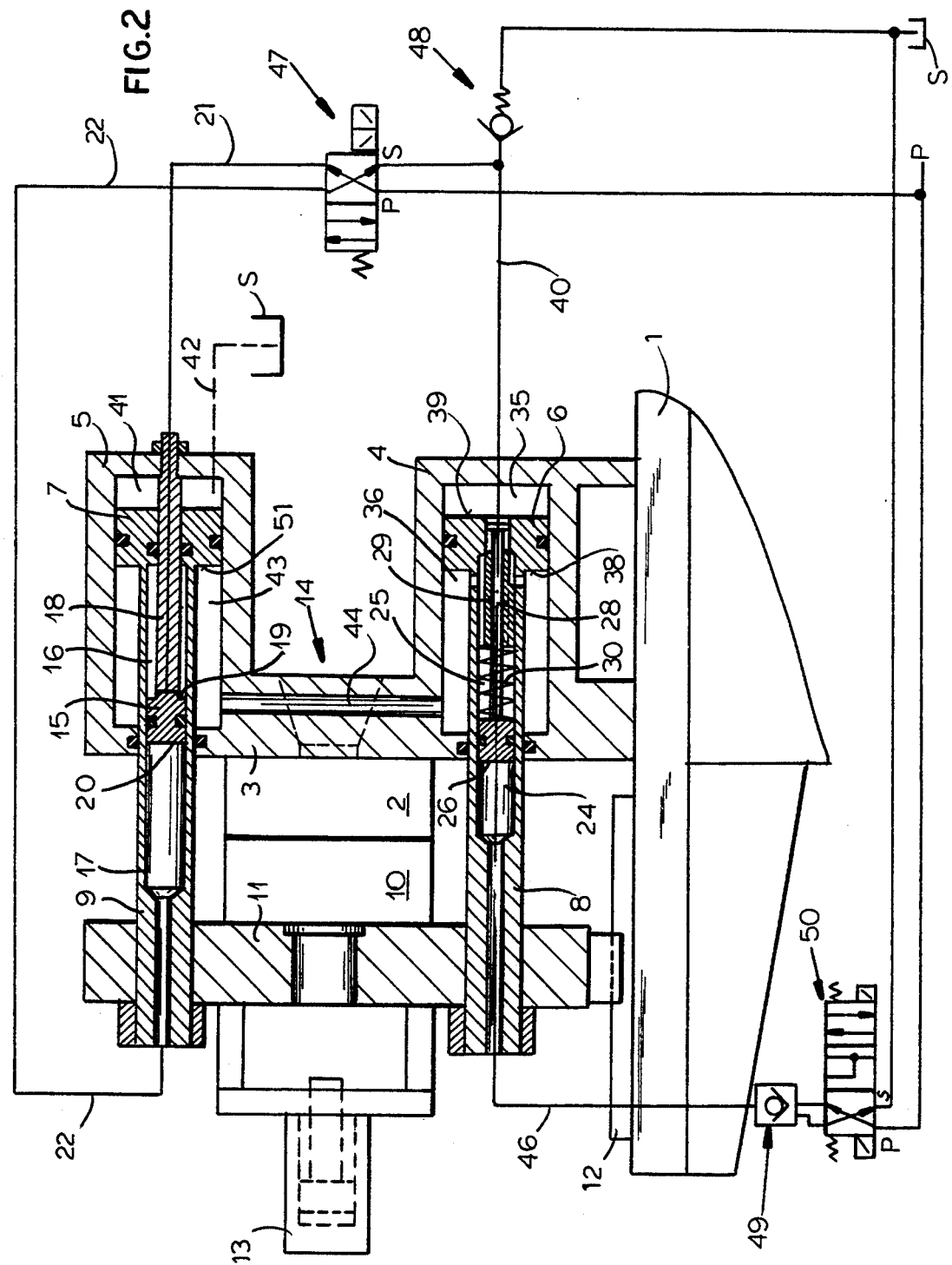
FIG. 2 is a view like FIG. 1 showing the apparatus as closing pressure builds up.
Figure 6:
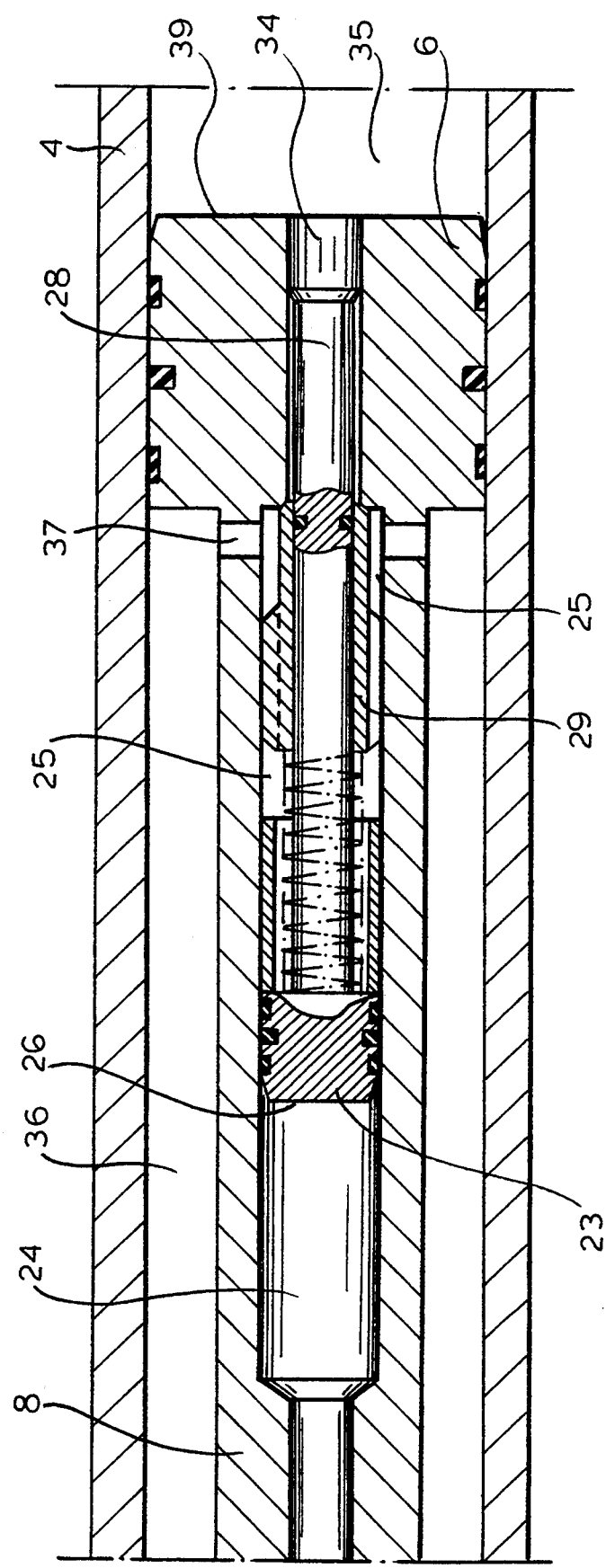

Closing pressure is built up as shown then in FIGS. 2, 6, and 8:

While the valve 47 remains in the FIG. 1 position, the valve 50 moves into the FIG. 2 position. This feeds high-pressure liquid from the source P to the front compartment 24, driving the piston 26 (or the piston 52 of FIG. 8) back until the sleeve 29 (or the sleeve 54) blocks the passage 34. Continued backward displacement of the piston 23 (or the piston 52) will force liquid from the chamber 25 through the passages 37 into the chamber 36, pushing back the piston 6. Since the passages 44 interconnect the front compartments 43 and 36 all the front faces 38 and 51 of all the pistons 6 and 7 will be pressurized, exerting considerable backward force to hold the mold 2, 10 closed. Furthermore the difference in surface areas between the faces 26 and 27 of the piston 23 (or 52) ensures considerable pressure amplification to hold the mold 2, 10 closed very solidly.

Figure 3:
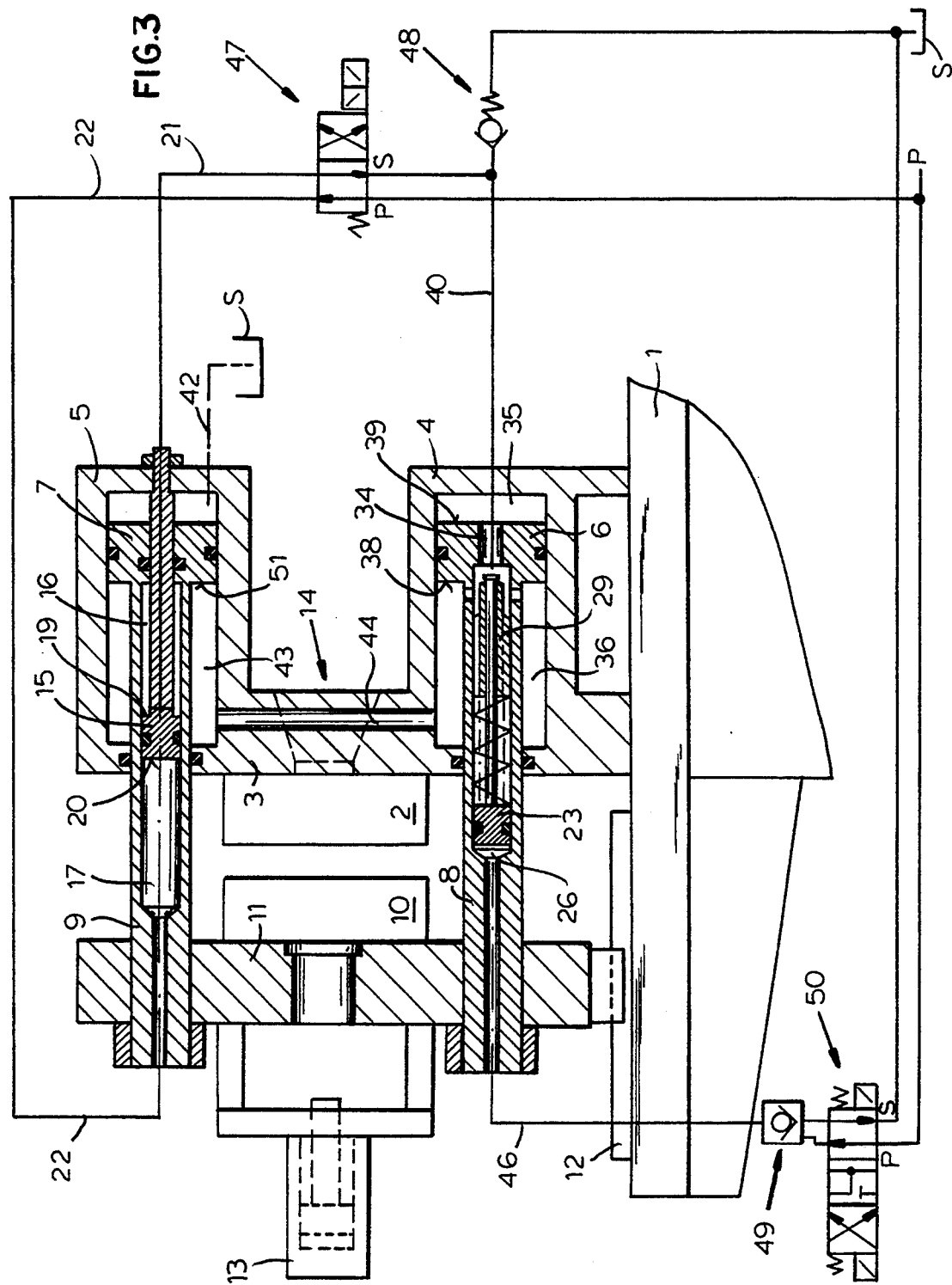
FIG. 3 is a view like FIG. 1 showing the apparatus as the mo 1 d opens.

The mold 2, 10 is opened as shown in FIG. 3:

The valve 47 is reversed to feed pressure to the front compartments 17 and vent the rear compartments 16 and simultaneously the valve 50 is switched to pressurize the pilot port 49', thereby opening the valve 49 for bidirectional flow, and this valve 49 is connected to the sump S.

The pressure in the compartments 17 therefore pushes the piston rods 9 and pistons 7 forward so that the line 42 draws liquid out of the sump S. At the same time the chambers 26 are depressurized completely so the slightly higher pressure in the line 40 pushes the valve elements 29 (or 54) forward to unblock the passages 34. As the pistons 6 and 7 move forward the liquid in the front compartments 36 and 43 can flow through the passages 37, the compartments 25, and out through the passages 34 to the rear compartment 35. Similarly liquid flowing out of the compartment 16 can pass via the lines 21 and 40 to the compartment 35.

In the system of FIG. 8 the pressure differential created across the piston 53, that is zero pressure on its front face 24 and about 6 bar on its opposite end 60, pushes it forward, and when it engages the abutment ring 59 it pulls the valve sleeve 54 forward also. This opens the passage 34 between the compartments 35 on the one side and the compartments 36 and 43 on the other for operation as described above.

I claim

1. In combination with a molding system having:
   a base;
   a fixed mold plate secured to the base;
   a fixed mold half carried on the fixed mold plate;
   a movable mold plate displaceable on the base longitudinally forward away from the fixed mold half and backward toward the fixed mold half; and
   a movable mold half carried on the movable plate and fittable with the fixed mold half, a mold-closing apparatus comprising:
   a pair of main cylinders fixed to the fixed mold plate;
   respective main pistons subdividing the main cylinders into respective front and rear main compartments and each having a piston rod secured to the movable mold plate and formed with a longitudinally extending chamber, one of the main pistons being formed with a main longitudinal passage extending between a rear end of the respective longitudinally extending chamber and the respective rear main compartment and with a secondary radial passage extending between the rear end of the respective longitudinally extending chamber and the respective front main compartment;

a small closing piston subdividing the chamber of the other main piston into a front opening compartment and a rear closing compartment and having a rearwardly extending piston rod fixed to the fixed mold plate, the small closing piston having a front face in the front opening compartment and a smaller annular rear face in the rear closing compartment;

a pressure-amplifying piston subdividing the chamber of the one piston into a front control compartment and a rear pressure-amplifying compartment, being freely longitudinally movable therein, and having
  a front face in the front control compartment,
  a smaller annular rear face in the rear pressure-amplifying compartment, and
  a piston rod extending longitudinally rearward from the pressure-amplifying piston;

a valve element longitudinally slidable on the rod of the pressure-amplifying piston and engageable sealingly in the main passage of the one main piston to block flow therethrough;

means interconnecting the valve element and the pressure-amplifying piston for displacement of the valve element out of blocking engagement in the main passage of the one main piston on displacement of the pressure-amplifying piston into a front position and into blocking engagement in the main passage on displacement of the pressure-amplifying piston into a rear position;

a conduit interconnecting the front main compartments;

a source of fluid having a high-pressure side and a low-pressure side;

first valve means operable
  in a closing position for connecting the closing compartment of the other piston to the high-pressure side of the source and the opening compartment to the low-pressure side and thereby engaging the mold halves together, and
  in an opening position for connecting the closing compartment to the low-pressure side and the opening compartment to the high-pressure side and thereby separating the mold halves from each other; and second valve means operable
  in a closing position for preventing fluid flow into or out of the control compartment and thereby arresting the pressure-amplifying piston in its chamber and thereby engaging the mold halves together,
  in a pressurizing position for connecting the control compartment to the high-pressure side and thereby displacing the pressure-amplifying piston toward its rear position and thereby forcing the engaged mold halves against each other, and
  in an opening position for connecting the control compartment to the low-pressure side and thereby separating the mold halves from each other.

2. The mold-closing apparatus defined in claim 1 wherein the fixed mold plate has four such main cylinders equispaced about the mold halves, diagonally opposite cylinders being identically configured.

3. The mold-closing apparatus defined in claim 1 wherein the combined effective surface area of a front face of the small closing piston and of a back face of the one main piston is greater than the combined effective surface area of front faces of the main pistons.

4. The mold-closing apparatus defined in claim 3 wherein the combined effective surface area of front faces of the main pistons is greater than the effective surface area of a back face of the one main piston.

5. The mold-closing apparatus defined in claim 1 wherein the interconnecting means is a spring connected between the valve element and the pressure-amplifying piston.

6. The mold-closing apparatus defined in claim 1 wherein the interconnecting means is an abutment on the rod of the pressure-amplifying piston engageable forwardly with the valve element.

7. The mold-closing apparatus defined in claim 1 wherein the first valve means includes:
  a two-position reversing valve having two ports on one side and two ports on another side, the two ports on the one side being connected to the opening and closing compartments, respectively, and
  a check valve connected between one of the ports of the other side of the reversing valve and the low-pressure side, the other port of the other side being connected to the high-pressure side, the one port of the other side also being permanently connected to the rear main compartment of the cylinder of the one main piston.

8. The mold-closing apparatus defined in claim 7 wherein the check valve maintains a predetermined pressure greater than the pressure of the low-pressure side in the rear main compartment of the cylinder of the one main piston.

9. The mold-closing apparatus defined in claim 1 wherein the second valve means includes:
  a three-position valve having on one side two ports connected to the low- and high-pressure sides of the source and another side with two ports; and
  a switchable check valve connected between one of the ports of the other side and the control compartment and oriented to normally permit flow only into the control compartment and having a pilot port connected to the other of the ports of the other side and pressurizable for bidirectional flow through the check valve.

10. A method of operating a molding system having:
a base;
a fixed mold plate secured to the base;
a fixed mold half carried on the fixed mold plate;
a movable mold plate displaceable on the base longitudinally forward away from the fixed mold half and backward toward the fixed mold half;
a movable mold half carried on the movable plate and fittable with the fixed mold half;
a pair of main cylinders fixed to the fixed mold plate;
respective main pistons subdividing the main cylinders into respective front and rear main compartments and each having a piston rod secured to the movable mold plate and formed with a longitudinally extending chamber, one of the main pistons being formed with a main longitudinal passage extending between a rear end of the respective longitudinally extending chamber and the respective rear main compartment and with a secondary radial passage extending between the rear end of the respective longitudinally extending chamber and the respective front main compartment;
a small closing piston subdividing the chamber of the other main piston into a front opening compartment and a rear closing compartment and having a rearwardly extending piston rod fixed to the fixed mold plate, the small closing piston having a front face in the front opening compartment and a smaller annular rear face in the rear closing compartment;

a pressure-amplifying piston subdividing the chamber of the one piston into a front control compartment and a rear pressure-amplifying compartment, being freely longitudinally movable therein, and having
- a front face in the front control compartment,
- a smaller annular rear face in the rear pressure-amplifying compartment, and
- a piston rod extending longitudinally rearward from the pressure-amplifying piston;

a valve element longitudinally slidable on the rod of the pressure-amplifying piston and engageable sealingly in the main passage of the one main piston to block flow therethrough;

means interconnecting the valve element and the pressure-amplifying piston for displacement of the valve element out of blocking engagement in the main passage of the one main piston on displacement of the pressure-amplifying piston into a front position and into blocking engagement in the main passage on displacement of the pressure-amplifying piston into a rear position;

a conduit interconnecting the front main compartments; and a source of fluid having a high-pressure side and a low-pressure side, the method comprising the steps of in a closing position of the mold halves, connecting the closing compartment of the other piston to the high-pressure side of the source and the opening compartment to the low-pressure side and preventing fluid flow into or out of the control compartment and thereby arresting the pressure-amplifying piston in its chamber, in an opening position of the mold halves connecting the closing compartment to the low-pressure side and the opening compartment to the high-pressure side and connecting the control compartment to the low-pressure side; and in a pressurizing position of the mold halves connecting the control compartment to the high-pressure side and thereby displacing the pressure-amplifying piston toward its rear position.

* * * * *